(12) United States Patent
Lee

(10) Patent No.: US 10,731,877 B2
(45) Date of Patent: Aug. 4, 2020

(54) DESICCANT COOLING SYSTEM

(71) Applicant: KOREA INSTITUTE OF SCIENCE AND TECHNOLOGY, Seoul (KR)

(72) Inventor: Dae Young Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 505 days.

(21) Appl. No.: 14/728,040

(22) Filed: Jun. 2, 2015

(65) Prior Publication Data
US 2015/0354839 A1 Dec. 10, 2015

(30) Foreign Application Priority Data
Jun. 9, 2014 (KR) .................. 10-2014-0069581

(51) Int. Cl.
*F24F 3/14* (2006.01)
*F24F 5/00* (2006.01)
(52) U.S. Cl.
CPC ............ *F24F 5/001* (2013.01); *F24F 3/1423* (2013.01); *F24F 5/0035* (2013.01)
(58) Field of Classification Search
CPC ........ F24F 3/1423; F24F 5/001; F24F 5/0035; F24F 3/14
(Continued)

(56) References Cited

U.S. PATENT DOCUMENTS 2,188,526 A * 1/1940 Burden ................. F25D 17/065
62/176.4

4,180,985 A * 1/1980 Northrup, Jr. ......... B01D 53/26
62/271
(Continued)

FOREIGN PATENT DOCUMENTS

JP 2008-111631 A 5/2008
JP 4827906 B2 11/2011
(Continued)

OTHER PUBLICATIONS

Korea Instutute of Science and Technology; This non-patent literature is a business plan that was made by the present applicant and submitted to the Korea Institute of Energy Technology Evaluation and Planning on Apr. 2, 2014. In addition the reference was reported before evaluation staffs of the Energy Technology Evaluation and Planning on May 12, 2014, and the content that is related to the present invention is shown in pp. 3-5 and 32-35.

*Primary Examiner* — Filip Zec

(57) ABSTRACT

A desiccant cooling system includes a desiccant cooling device partitioned into a desiccant cooling path and a regeneration path and including a desiccant rotor having one side on the desiccant cooling path and other side on the regeneration path and a cooler configured to cool high-temperature low-humidity air which has been dehumidified while passing through the one side of the desiccant rotor; and a vapor compression cooling device including a compressor configured to compress a refrigerant, a condenser configured to be cooled by the air cooled by passing through the cooler, and condenses the refrigerant compressed by the compressor, an expansion valve configured to expand the refrigerant condensed by the condenser, and an evaporator configured to evaporate the refrigerant expanded by the expansion valve and transfer the evaporated refrigerant to the compressor.

16 Claims, 7 Drawing Sheets

(58) Field of Classification Search
USPC .......................................... 62/94, 428, 274
See application file for complete search history.

(56) References Cited

U.S. PATENT DOCUMENTS

| | | | | |
|---|---|---|---|---|
| 4,987,748 | A * | 1/1991 | Meckler | F02G 1/043 62/176.1 |
| 5,579,647 | A * | 12/1996 | Calton | F24F 3/1411 62/223 |
| 5,718,122 | A * | 2/1998 | Maeda | F24F 3/1411 62/185 |
| 5,791,153 | A * | 8/1998 | Belding | B01D 53/265 62/271 |
| 6,029,462 | A * | 2/2000 | Denniston | B01D 53/06 62/244 |
| 6,338,258 | B1 * | 1/2002 | Lee | F24F 5/0035 62/121 |
| 6,575,228 | B1 * | 6/2003 | Ragland | F24F 3/1411 165/54 |
| 6,918,263 | B2 * | 7/2005 | Lee | F24F 3/1423 62/271 |
| 7,886,986 | B2 * | 2/2011 | Fischer, Jr. | F24F 3/1423 236/49.3 |
| 10,323,867 | B2 * | 6/2019 | Vandermeulen | F24F 3/147 |
| 2003/0033821 | A1 * | 2/2003 | Maisotsenko | F24F 3/1411 62/94 |
| 2004/0194490 | A1 * | 10/2004 | Lee | F24F 3/1423 62/271 |
| 2006/0086120 | A1 * | 4/2006 | Kashirajima | F24F 3/1423 62/271 |
| 2011/0214446 | A1 * | 9/2011 | Fukudome | F24F 3/1423 62/271 |
| 2011/0308265 | A1 * | 12/2011 | Phannavong | F24F 12/006 62/160 |
| 2013/0186118 | A1 * | 7/2013 | Ohs | F24F 3/153 62/94 |
| 2014/0260367 | A1 * | 9/2014 | Coutu | F24F 3/1417 62/89 |
| 2015/0096714 | A1 * | 4/2015 | Dagley | F24F 3/003 165/8 |

FOREIGN PATENT DOCUMENTS

| | | |
|---|---|---|
| KR | 10-0357285 B1 | 10/2002 |
| KR | 1020050065259 A | 6/2005 |
| KR | 100947616 B1 | 3/2010 |
| KR | 1020130013576 A | 2/2013 |

* cited by examiner

DESICCANT COOLING SYSTEM

RELATED APPLICATION

This application claims the benefit of Korean Patent Application No. 10-2014-0069581, filed on Jun. 9, 2014, in the Korean Intellectual Property Office, the disclosure of which is incorporated herein in its entirety by reference.

BACKGROUND

1. Field

One or more exemplary embodiments relate to a desiccant cooling system, and more particularly, to a desiccant cooling system that uses a cooling output of a desiccant cooling device to cool a condenser in a vapor compression cooling device.

2. Description of the Related Art

Desiccant cooling systems according to the related art include a desiccant rotor regenerated by absorbing heat so that outside air passes through one side of the desiccant rotor and a high-temperature low-humidity state can be formed and air in the high-temperature low-humidity state passes through a sensible rotor or a regenerative evaporative cooler again and is changed into a low-temperature low-humidity state and supplied to an indoor space.

According to the desiccant cooling systems of the related art, desiccant-cooled air is produced in an integrated device and supplied to an air-conditioning space. The integrated device is installed in a machine compartment, and the desiccant-cooled air is supplied to the indoor space through a duct. Thus, when the desiccant cooling systems according to the related art are used in an office or residential building, a separate duct to connect the integrated device and the indoor space should be additionally installed in the building, and thus, the installation cost, duct noise, and blowing power increase.

SUMMARY

One or more exemplary embodiments include a desiccant cooling system that uses a cooling output of a desiccant cooling device to cool a condenser of a vapor compression cooling device.

Additional aspects will be set forth in part in the description which follows and, in part, will be apparent from the description, or may be learned by practice of the presented embodiments.

According to one or more exemplary embodiments, a desiccant cooling system includes: a desiccant cooling device partitioned into a desiccant cooling path and a regeneration path and including a desiccant rotor having one side on the desiccant cooling path and other side on the regeneration path and a cooler configured to cool high-temperature low-humidity air which has been dehumidified while passing through the one side of the desiccant rotor; and a vapor compression cooling device including a compressor configured to compress a refrigerant, a condenser configured to be cooled by the air cooled by passing through the cooler, and condenses the refrigerant compressed by the compressor, an expansion valve configured to expand the refrigerant condensed by the condenser, and an evaporator configured to evaporate the refrigerant expanded by the expansion valve and transfer the evaporated refrigerant to the compressor.

The desiccant rotor may include a rotation shaft configured to rotate the desiccant rotor.

The desiccant cooling system may include an evaporation water injector configured to inject evaporation water onto the condenser.

The desiccant cooling device may further include: a process inlet port placed at one side of the desiccant cooling path and configured to draw out air of an outdoor space into the desiccant cooling path; a process outlet port placed at the other side of the desiccant cooling path and configured to discharge the air passing through the condenser to the outside; and filters configured to filter various foreign substances or bacteria around at least one of the process inlet port and the process outlet port.

The desiccant cooling device may further include: a regeneration inlet port placed at one side of the regeneration path and configured to supply air from an outdoor space into the regeneration path; a regeneration outlet port placed at the other side of the regeneration path and configured to discharge the air passed through the desiccant rotor to the outside; and filters configured to filter various foreign substances or bacteria around at least one of the regeneration inlet port and the regeneration outlet port.

The desiccant cooling system may further include a heating device between the desiccant rotor and the regeneration inlet port within the regeneration path and configured to heat the air before the air passes through the desiccant rotor.

The cooler may be a sensible rotor.

The cooler may be a regenerative evaporative cooler.

The heating device may be a heating coil that heats by electricity.

The heating device may be a hot water heat exchanger.

The desiccant cooling device may further include a ventilation air supply port on the desiccant cooling path and configured to supply a part of the air passed through the cooler to an air-conditioning space.

The desiccant cooling device may further include a ventilation introduction port on the desiccant cooling path and configured to recover the air from the air-conditioning space and introduce the recovered air between the cooler and the condenser.

The desiccant cooling device may further include an introduction port for exclusive use for ventilation along the regeneration path and configured to recover air from the air-conditioning space and introduce the recovered air between the regeneration inlet port and the desiccant rotor.

The desiccant cooling device may further include an air supply port for exclusive use for ventilation along the desiccant cooling path and configured to supply the air passed through the desiccant rotor in the air-conditioning space.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
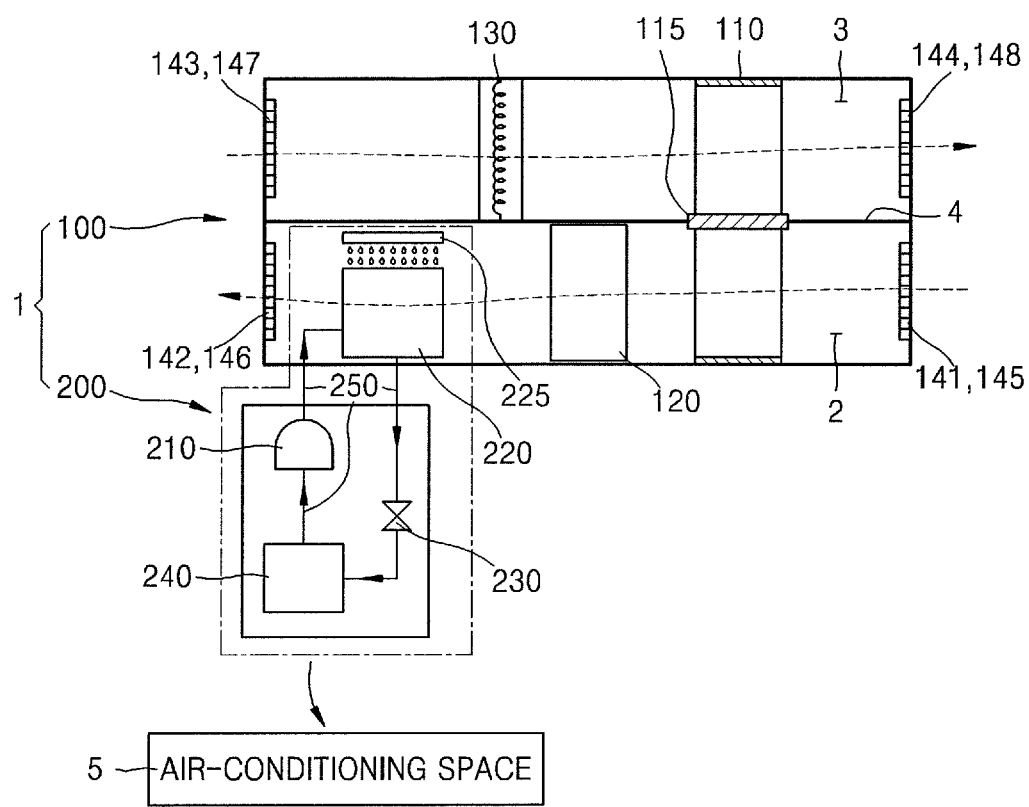
FIG. 1 is a view of a configuration of a desiccant cooling system according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
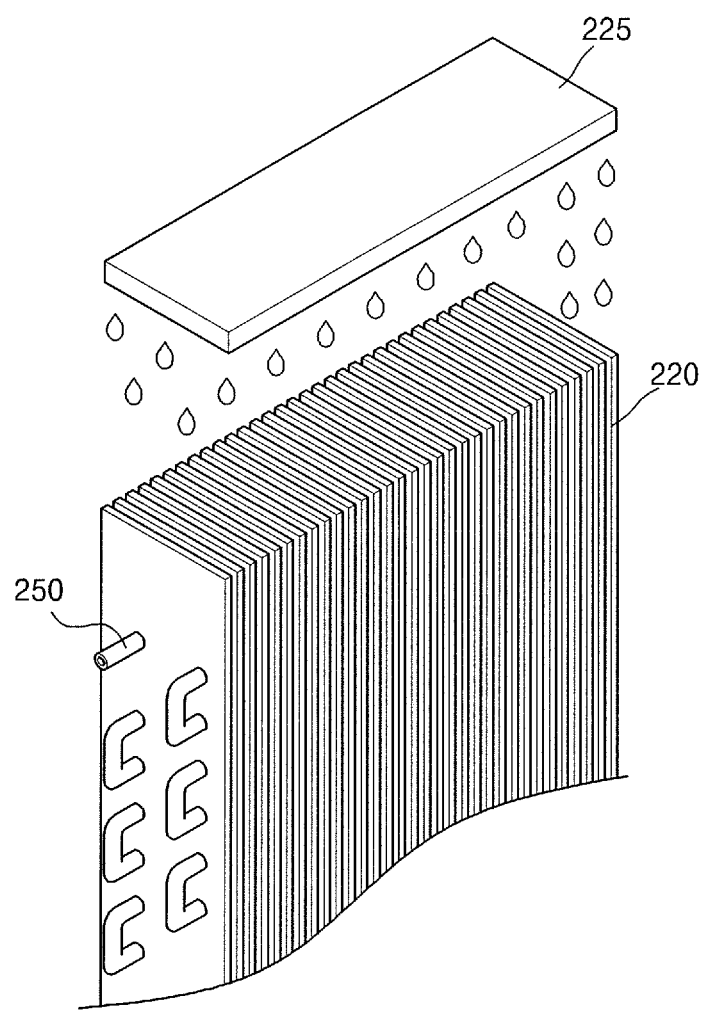
FIG. 2 is a detailed view of a condenser illustrated in FIG. 1.

FIG. 1 is a view of a configuration of a desiccant cooling system according to an exemplary embodiment, and FIG. 2 is a detailed view of a condenser illustrated in FIG. 1.

First, referring to FIG. 1, the desiccant cooling system 1 includes a desiccant cooling device 100 and a vapor compression cooling device 200. The desiccant cooling device 100, an inside of which is partitioned by a barrier wall 4 into a desiccant cooling path 2 and a regeneration path 3, includes a desiccant rotor 110 and a cooler 120, and the vapor compression cooling device 200 includes a compressor 210, a condenser 220, an expansion valve 230, and an evaporator 240.

The desiccant cooling path 2 and the regeneration path 3 are formed in the desiccant cooling device 100, as described above. The desiccant cooling device 100 includes the desiccant rotor 110 having one side disposed on the desiccant cooling path 2 and the other side disposed on the regeneration path 3, and the cooler 120 that cools high-temperature low-humid air which has been dehumidified while passing through the desiccant rotor 110 on the desiccant cooling path 2.

Furthermore, the desiccant cooling device 100 includes a process inlet port 141 that is placed at one side of the desiccant cooling path 2 and inhales air from an outdoor space into the desiccant cooling path 2, and a process outlet port 142 that is placed at the other side of the desiccant cooling path 2 and discharges the air passing through the condenser 220 toward the outside. Also, the desiccant cooling device 100 may further include filters 145 and 146 that filter various foreign substances or bacteria around the process inlet port 141 and the process outlet port 142 or integrally with the process inlet port 141 and the process outlet port 142.

Next, the desiccant cooling device 100 may further include a regeneration inlet port 143 that is placed at one side of the regeneration path 3 and supplies the air from the outdoor space into the regeneration path 3, and a regeneration outlet port 144 that is placed at the other side of the regeneration path 3 and discharges the air passed through the desiccant rotor 110 toward the outside. Also, the desiccant cooling device 100 may further include filters 147 and 148 that filter various foreign substances or bacteria around the regeneration inlet port 143 and the regeneration outlet port 144 or integrally with the regeneration inlet port 143 and the regeneration outlet port 144.

Also, the desiccant cooling device 100 may further include a heating device 130 disposed between the desiccant rotor 110 and the regeneration inlet port 143. The heating device 130 heats the air inhaled into the regeneration inlet port 143 of the regeneration path 3 up to a temperature required for regeneration of the desiccant rotor 110. Various heating devices, such as heating coils or hot water heat exchangers heated by electricity, may be used as the heating device 130.

Here, when the hot water heat exchanger is used as the heating device 130, waste heat from various power generation facility, industrial facility, or incineration facility, may be used to supply hot water. In particular, when the hot water is supplied to the hot water heat exchanger by using the waste heat in a summer season in which a cooling load is far higher than a heating load, thermal energy to be discarded may be used in cooling and thus, energy usage efficiency may be nationally maximized. In addition, the hot water may also be supplied by using solar heat, geothermal heat or gas as a heat source.

The desiccant rotor 110 may have a structure including honeycomb-shaped pores formed of ceramic paper, and a desiccant, such as silica gel, is stably coated on a surface of the ceramic paper. Also, the desiccant rotor 110 may be rotated by a rotation shaft 115 installed in the vicinity of the barrier wall 4 that partitions the desiccant cooling device 100 into the desiccant cooling path 2 and the regeneration path 3. While a part of the desiccant rotor 110 that rotates about the rotation shaft 115 passes through the desiccant cooling path 2, the desiccant rotor 110 performs a desiccant function of absorbing water vapors from the air introduced through the process inlet port 141.

While the other part of the desiccant rotor 110 except for the part of the desiccant rotor 110 that passes through the desiccant cooling path 2 passes through the regeneration path 3, the desiccant rotor 110 is regenerated by the air that is introduced through the regeneration inlet port 143, passes through the heating device 130, and is heated and enters the desiccant cooling path 2 due to rotation of the rotation shaft 115, so that the desiccant rotor 110 consistently performs the desiccant function.

The cooler 120 is a device that cools the high-temperature low-humid air passed through the desiccant rotor 110. For example, a sensible rotor (not shown) or a regenerative evaporative cooler (not shown) may be used as the cooler 120. However, the cooler 120 in an exemplary embodiment is not limited thereto, and any type of device that cools the high-temperature low-humid air passed through the desiccant rotor 110 may be used as the cooler 120.

The sensible rotor (not shown) is a device that cools air passed therethrough by exchanging sensible heat with external air. The regenerative evaporative cooler (not shown) is a device that recovers the air into a dry channel through which high-temperature dry air passed through the desiccant rotor 110 passes, recovers a part of the air passed through the dry channel into a wet channel adjacent to the dry channel, and evaporates water from the wet channel through which the high-temperature dry air passes, thereby cooling the air passed through the dry channel. The sensible rotor (not shown) and the regenerative evaporative cooler (not shown) are well-known devices and thus, a more detailed description thereof will be omitted.

The vapor compression cooling device 200 having the same configuration as that of an electric air conditioner according to the related art includes a compressor 210 that compresses the refrigerant, a condenser 220 that condenses the refrigerant compressed by the compressor 210, an expansion valve 230 that expands the refrigerant condensed by the condenser 220, and an evaporator 240 that evaporates the refrigerant expanded by the expansion valve 230 and then transfers the refrigerant to the compressor 210.

In this case, the compressor 210, the condenser 220, the expansion valve 230, and the evaporator 240 are connected to a refrigerant pipe 250 and constitute one cooling cycle. In one cooling cycle, the compressor 210, the condenser 220, the expansion valve 230, and the evaporator 240 are circulated along the refrigerant pipe 250 and supplies cooling to the air-conditioning space 5.

Here, the condenser 220 of the vapor compression cooling device 200 may be disposed on the desiccant cooling path 2 of the desiccant cooling device 100 so as to be cooled by the cooled air passing through the cooler 120. However, embodiments are not limited thereto, and the desiccant cooling path 2 and the condenser 220 may be connected to each other through a separate pipe (not shown) so that the cooled air discharged from the desiccant cooling path 2 may be transferred to the condenser 220 through the process outlet port 142. Thus, the condenser 220 may pass through the cooler 120 and may be cooled by the cooled air.

Also, the condenser 220 may further include an evaporation water injector 225. Referring to FIG. 2, the evaporation water injector 225 is installed at an upper portion of the condenser 220 and injects water onto the condenser 220. Water injected onto the surface of the condenser 220 is evaporated by low-temperature and low-humid air passed through the cooler 120. In this case, water is evaporated by taking away heat of the refrigerant flowing through the refrigerant pipe 250. This causes cooling effect of the refrigerant to be further improved. The air transferred from the cooler 120 to the condenser 220 is heated and humidified by water vapor evaporated when passing through the condenser 220, passes through the condenser 220 and is discharged into an outdoor space through the process outlet port 142.

In this case, the evaporation water injector 225 is not installed only at the upper portion of the condenser 220. Of course, the evaporation water injector 225 may be disposed at a side or a lower side of the condenser 220 so as to evaporate and cool the condenser 220 by injecting water onto the surface of the condenser 220.

Figure 3:
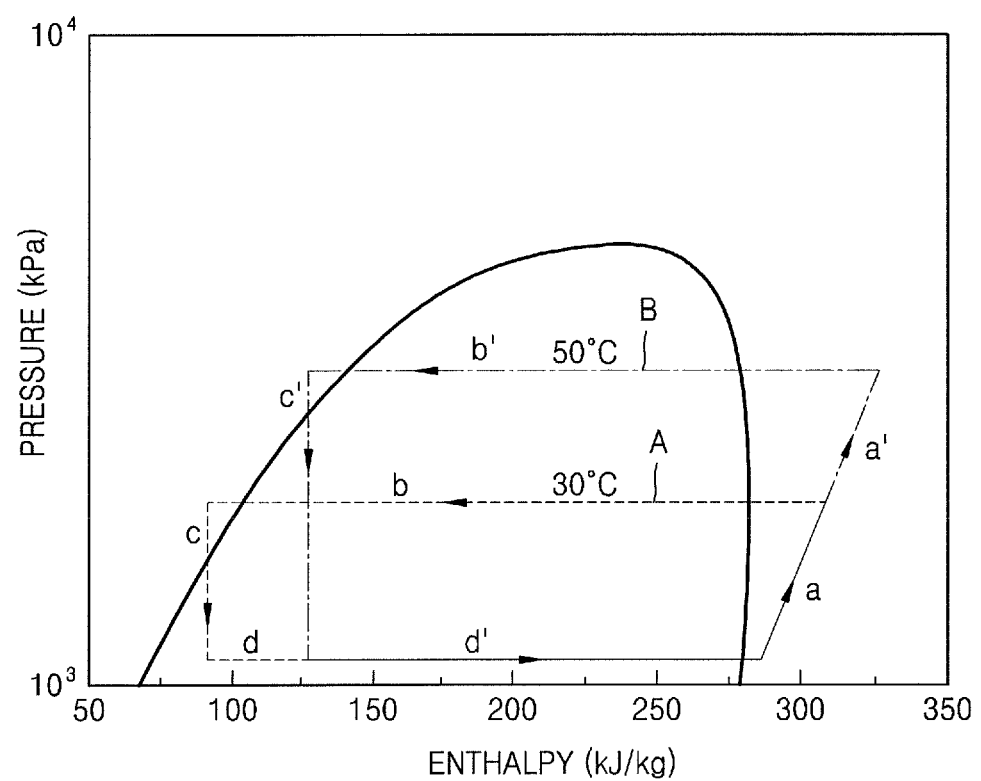
FIG. 3 is a graph showing pressure enthalpy (P-h) mollier diagram of a refrigerant (R410A) that circulates in a refrigerant circuit of FIG. 1.
Figure 4:
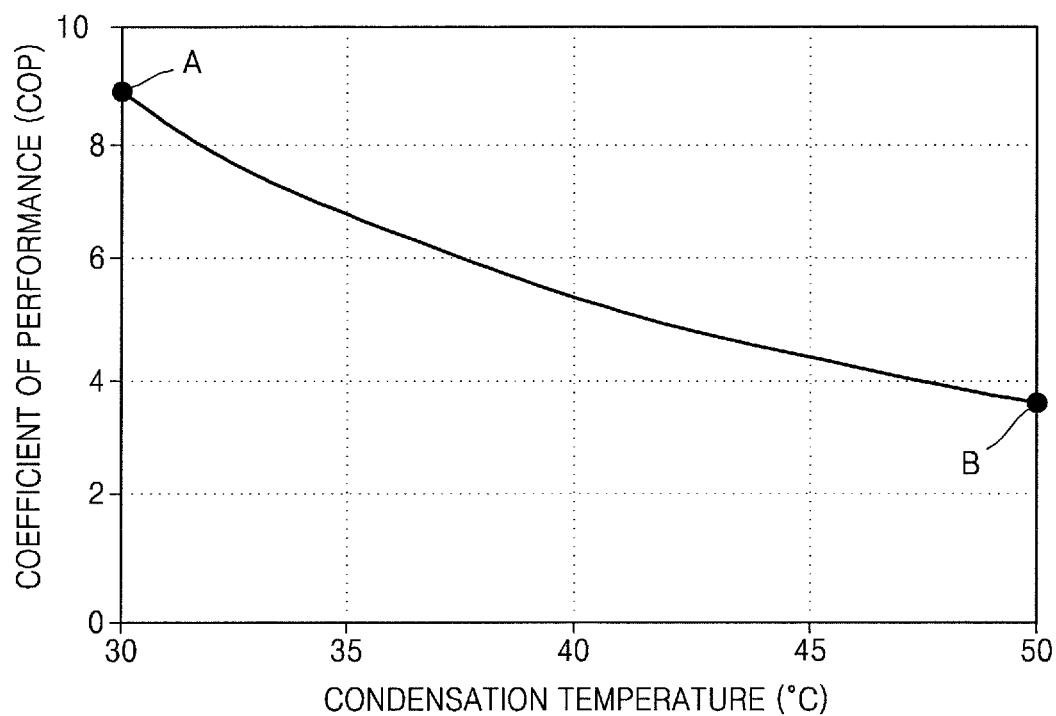
FIG. 4 is a graph showing a change in coefficients of performance (COPs) of a vapor compression cooling device according to a change in condensation temperatures of the condenser of FIG. 1.
Figure 5:
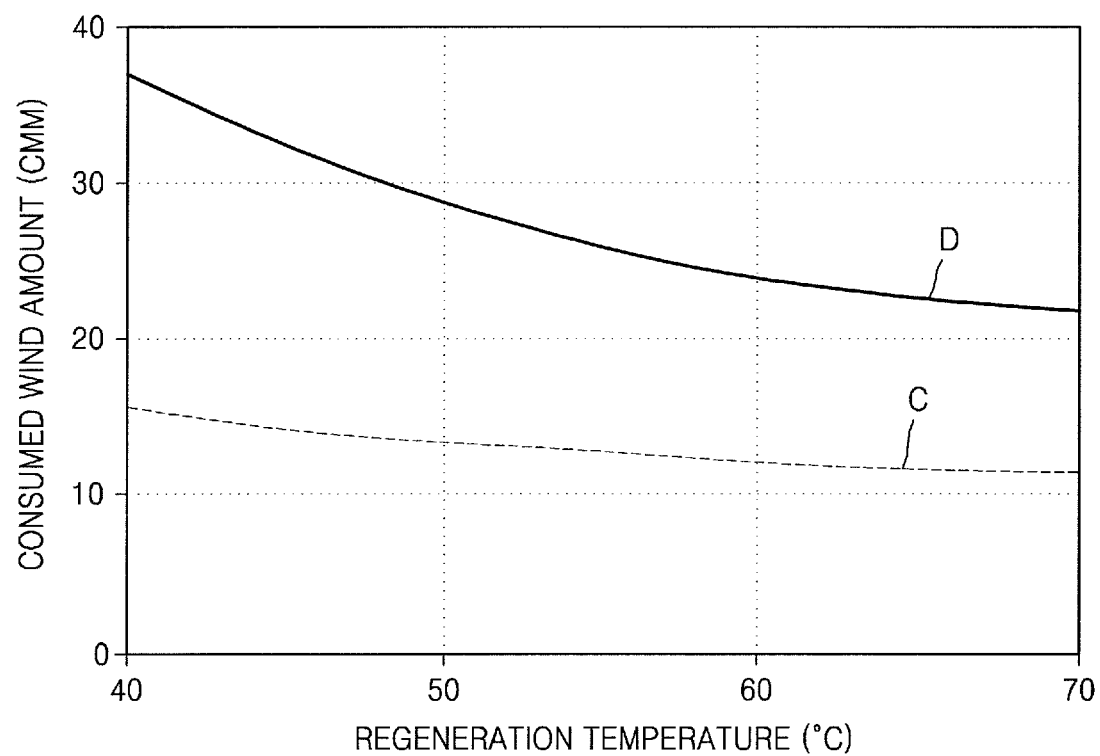
FIG. 5 is a graph showing the air flow rate required to supply 10 kW of a cooling output according to a change in regeneration temperatures of a desiccant rotor of FIG. 1.

Next, the effect of cooling the condenser 220 of the vapor compression cooling device 200 by using cooling produced from the desiccant cooling device 100 will be described with reference to FIGS. 3 through 5. FIG. 3 is a graph showing pressure enthalpy (P-h) mollier diagram of a refrigerant (R410A) that circulates in a refrigerant circuit of FIG. 1, and FIG. 4 is a graph showing a change in coefficients of performance (COPs) of a vapor compression cooling device according to a change in condensation temperatures of the condenser of FIG. 1, and FIG. 5 is a graph showing the air flow rates required to supply 10 kW of a cooling output according to a change in regeneration temperatures of a desiccant rotor of FIG. 1.

First, referring to FIG. 3, A is a graph showing a cycle diagram of the vapor compression cooling device 200 when the condensation temperature of the condenser 220 is 30° C., and B is a cycle diagram of the vapor compression cooling device 200 when the condensation temperature of the condenser 220 is 50° C. In FIG. 3, a and a' represent a state change when the refrigerant is compressed by passing through the compressor 210, b and b' represent a state change when the compressed refrigerant is condensed by passing through the condenser 220, c and c' represent a state change when the condensed refrigerant is expanded by passing through the expansion valve 230, and d and d' represent a state change when the expanded refrigerant is evaporated by passing through the evaporator 240.

Power consumed by the compressor 210 required for the cooling cycle may be determined by referring to a and a', and a cooling capacity of the vapor compression cooling device 200 may be checked via lengths of d and d'. That is, the length of a' that is greater than the length of a means that the power consumed by the compressor 210 when the condensation temperature of the condenser 220 is 50° C. (B) is greater than that of the compressor 210 when the condensation temperature of the condenser 220 is 30° C. (A), and the length of d that is greater than the length of d' means that the cooling capacity of the vapor compression cooling device 200 when the condensation temperature of the condenser 220 is 30° C. (A) is greater than that of the vapor compression cooling device 200 when the condensation temperature of the condenser 220 is 50° C. (B).

Thus, when the condensation temperature of the condenser 220 is 30° C. (A), a higher cooling capacity d may be obtained with less input a of the compressor 210 compared to the case where the condensation temperature of the condenser 220 is 50° C. (B).

In more detail, an air-cooled vapor compression cooling device (not shown) according to the related art cools the condenser 220 by using the outdoor air (by not using the cooled air supplied by the desiccant cooling device, like in an embodiment. In this case, when the outdoor air is at 35° C. and has 40% RH, the condensation temperature of the condenser 220 using air-cooling is approximately 50° C. Thus, the air-cooled vapor compression cooling device (not shown) that uses the outdoor air to cool the condenser 220 has a shape of the cooling cycle shown in the graph B of FIG. 3.

The temperature of air obtained by the desiccant cooling device 100 is about 15 to 20° C. that is lower by 15 to 20° C. than the outdoor air. When the condenser 220 of the vapor compression cooling device 200 is cooled using the air obtained by the desiccant cooling device 100, the condensation temperature of the condenser 220 may be lowered by about 20° C. compared to the air-cooled vapor compression cooling device (not shown) according to the related art. Furthermore, as described above, the condenser 220 further includes the evaporation water injector 225 so as to further lower the condensation temperature of the condenser 220 by using evaporation latent heat of the water by injecting the water into the condenser 220.

Thus, by using the air obtained by the desiccant cooling device 100 to cool the condenser 220 in the vapor compression cooling device 200, a larger cooling output may be obtained with less compressor input.

Next, a change of cooling cycle efficiency, i.e., a coefficient of performance (COP) of the vapor compression cooling device 200 according to a condensation temperature change will be described with reference to FIG. 4.

Referring to FIG. 4, when a refrigerant is R410A, an evaporation temperature is 10° C., an evaporator superheating is 5° C., a condenser subcooling is 5° C., the efficiency of a compressor is 0.7 and a condensation temperature is 50°

C. (B), whereas a COP of the air-cooled vapor compression cooling device (not shown) according to the related art is 3.8. When, according to an embodiment, the air obtained by the desiccant cooling device 100 is used to cool the condenser 220 (A), for example, when the condensation temperature is 30° C., the COP of the vapor compression cooling device 200 is 8.8, which is an increase more than twice compared to the COP of 3.8 of the air-cooled vapor compression cooling device (not shown).

Next, a change of an air flow rate for supplying 10 kW of a cooling output according to a change of a regeneration temperature of the desiccant rotor 110 will be briefly described with reference to FIG. 5.

Referring to FIG. 5, C represents a case where a cooling agent is supplied to the desiccant cooling system 1 according to an exemplary embodiment, and D represents a case where a cooling agent is supplied to a hybrid desiccant cooling system (not shown) according to the related art. In both C and D, as the regeneration temperature of the desiccant rotor 110 rises, the required air flow rate may be reduced. However, in particular, in the case of C, that is, the desiccant cooling system 1 according to an exemplary embodiment, the required air flow rate compared to the hybrid desiccant cooling system (not shown) according to the related art is about half.

This means that, in an exemplary embodiment, as described above, air of an outlet of the desiccant cooling device 100 is used to evaporate and cool the condenser 220 so that cooling performance may be improved and thus the same cooling output may be obtained with less air flow rate than that of the hybrid desiccant cooling system (not shown) according to the related art.

In this way, when the required air flow rate is small, required capacities of main components of the desiccant cooling system 1, such as the desiccant rotor 110 and the cooler 120, are reduced and thus, the consumed power and regeneration energy are reduced.

Figure 6:
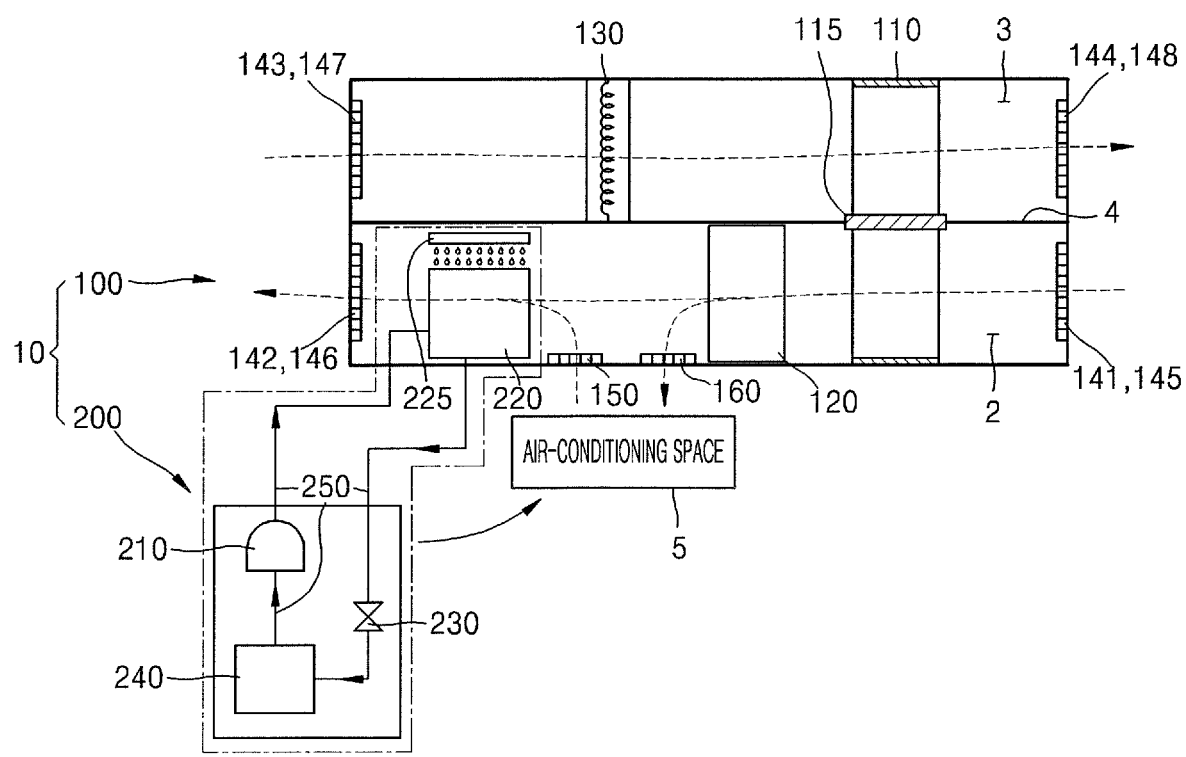
FIG. 6 is a view of a configuration of a desiccant cooling system according to another exemplary embodiment.

Next, a desiccant cooling system 10 that may supply air produced by the desiccant cooling device 100 directly into the air-conditioning space 5 for the purpose of ventilation as necessary will be described with reference to FIG. 6. FIG. 6 is a view of a configuration of a desiccant cooling system according to another exemplary embodiment.

Referring to FIG. 6, a desiccant cooling device 100 may further include a ventilation introduction port 150 that is formed on a desiccant cooling path 2, recovers the air from an air-conditioning space 5 and introduces the recovered air immediately in front of a condenser 220, and a ventilation air supply port 160 that is formed on the desiccant cooling path 2 and supplies a part of the air passed through a cooler 120 into the air-conditioning space 5.

A desiccant cooling system 10 according to another exemplary embodiment has a structure in which fresh air may be supplied into the air-conditioning space 5 so as to perform indoor ventilation during a cooling operation, supplies a part of the air dehumidified and cooled by the desiccant rotor 110 and the cooler 120 into the air-conditioning space 5, and the air recovered from the air-conditioning space 5 is introduced again immediately in front of the condenser 220 and is used to cool the condenser 220. In this case, a ventilation air flow rate required for a common house is about 4 to 5 CMM and uses about 30 to 40% of the total air flow rate, 12 CMM, produced from the desiccant cooling system 1 having the cooling capacity of 10 kW.

In detail, the desiccant cooling system 10 according to another exemplary embodiment of FIG. 6 may supply cooling into the air-conditioning space 5 and may utilize characteristics, such as ventilation, deodorization, and antibacterial effect which are large advantages of the desiccant cooling device 100. Also, only a small air flow rate needs to be supplied for the purpose of ventilation. Thus, a ventilation duct that has been already installed in the air-conditioning space 5 may be intactly utilized without installing a separate duct.

In this case, the air introduced again immediately in front of the condenser 220 from the air-conditioning space 5 is air discharged from the air-conditioning space 5 and has a higher wet-bulb temperature than that of air that is dehumidified and cooled by the desiccant rotor 110 and the cooler 120. However, even in this case, if the temperature of air in the air-conditioning space 5 is 27° C. and humidity is 50% RH, an increase in the wet-bulb temperature of an inlet of the condenser 220 is merely 1° C. and thus, there is no large difference in a cooling output of the desiccant cooling system 1.

Figure 7:
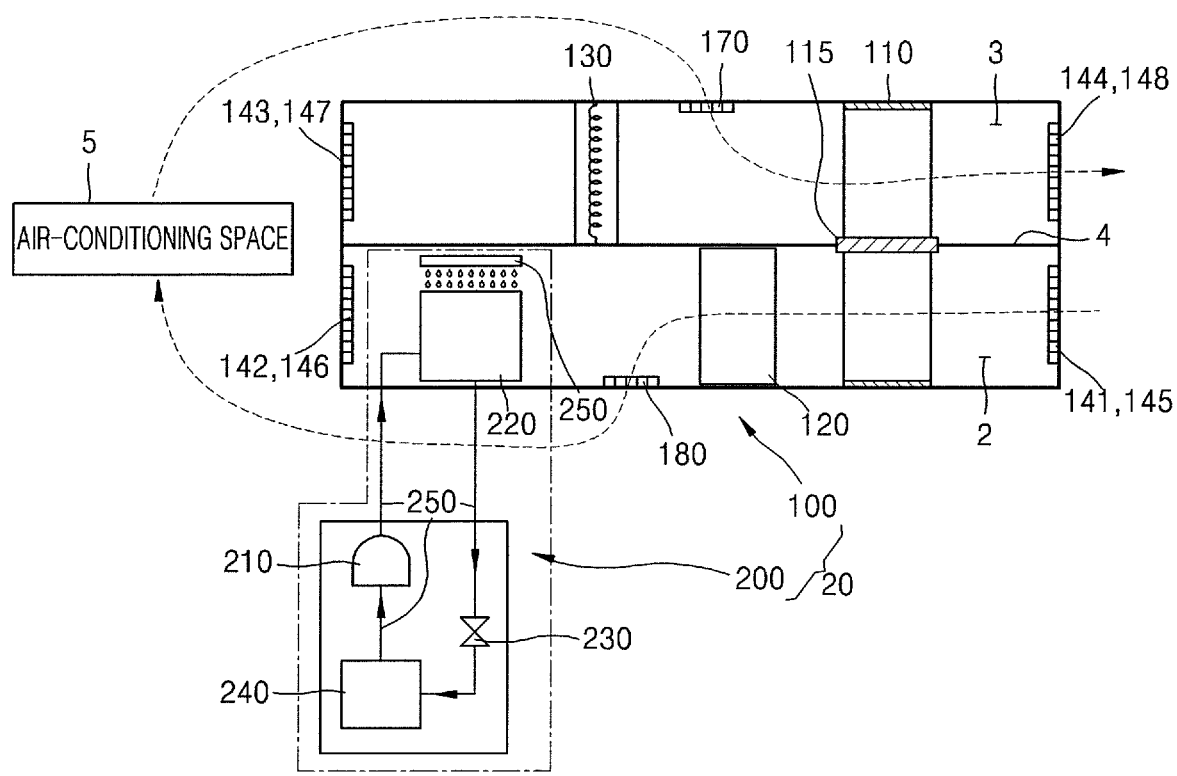
FIG. 7 is a view of a configuration of a desiccant cooling system according to another exemplary embodiment.

Hereinafter, a structure of a desiccant cooling system 20 that may operate with an energy recovering ventilation device during the change of seasons, such as spring and fall, except for a cooling operation will be described with reference to FIG. 7. FIG. 7 is a view of a configuration of a desiccant cooling system according to another exemplary embodiment.

Referring to FIG. 7, a desiccant cooling device 100 may further include an introduction port 170 for exclusive use of ventilation formed on a regeneration path 3, recovering air from the air-conditioning space 5 and introducing the recovered air between a regeneration inlet port 143 and a desiccant rotor 110, and an air supply port 180 for exclusive use of ventilation formed on a desiccant cooling path 2 and supplying the air passing through the desiccant rotor 110 to the air-conditioning space 5.

A desiccant cooling system 20 according to another exemplary embodiment operates for the exclusive use of ventilation when cooling is not required. In this case, a cooler 120 and a heating device 130 of the desiccant cooler 100 and a condenser of a vapor compression cooling device 200 do not operate, and the desiccant rotor 110 does not perform a desiccant function and operates as a total heat exchanger.

In this case, a ventilation operation is performed as below. First, the air recovered from the air-conditioning space 5 is introduced into the introduction port 170 for the exclusive use of ventilation, passes through the desiccant rotor 110 along the regeneration path 3 and transfer sensible heat and latent heat of the air to the desiccant rotor 110. Next, the sensible heat and the latent heat transferred to the desiccant rotor 110 from the air recovered from the air-conditioning space 5 in this way are transferred to an outside air from the suction port 141 according to rotation of the desiccant rotor 110, and the outside air to which the sensible heat and the latent heat are transferred, is introduced into the air-conditioning space 5 through the air supply port 180 for the exclusive use of ventilation.

As described above, according to the one or more of the above exemplary embodiments, a cooling output of a desiccant cooling device is used to cool a condenser of a vapor compression cooling device so that a fan power of the desiccant cooling device may be reduced and simultaneously the efficiency of the vapor compression cooling device may be increased. In addition, cooling may be supplied into an indoor space without additionally installing a separate duct in a desiccant cooling system according to the related art.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A desiccant cooling system comprising:
a desiccant cooling device partitioned by a barrier wall into a desiccant cooling path and a regeneration path and comprising a desiccant rotor having one side on the desiccant cooling path and other side on the regeneration path and a cooler, provided downstream of the desiccant rotor in the desiccant cooling path, configured to cool high-temperature low-humidity air which has been dehumidified while passing through the one side of the desiccant rotor; and
a vapor compression cooling device comprising
a compressor configured to compress a refrigerant,
a condenser, provided downstream of the cooler in the desiccant cooling path, configured to be cooled by the air cooled by passing through the cooler and condense the refrigerant compressed by the compressor,
an expansion valve configured to expand the refrigerant condensed by the condenser, and
an evaporator configured to evaporate the refrigerant expanded by the expansion valve and transfer the evaporated refrigerant to the compressor,
wherein the air of the desiccant cooling path is discharged from the desiccant cooling path toward outside of the desiccant cooling device after passing through the condenser.

2. The desiccant cooling system of claim 1, wherein the desiccant rotor comprises a rotation shaft configured to rotate the desiccant rotor.

3. The desiccant cooling system of claim 1, further comprising an evaporation water injector configured to inject evaporation water onto the condenser.

4. The desiccant cooling system of claim 1, wherein the desiccant cooling device further comprises:
a process inlet port placed at one side of the desiccant cooling path and configured to draw out air of an outdoor space into the desiccant cooling path;
a process outlet port placed at the other side of the desiccant cooling path and configured to discharge the air passing through the condenser to the outside; and
filters configured to filter various foreign substances or bacteria around at least one of the process inlet port and the process outlet port.

5. The desiccant cooling system of claim 1, wherein the desiccant cooling device further comprises:
a regeneration inlet port placed at one side of the regeneration path and configured to supply air from an outdoor space into the regeneration path;
a regeneration outlet port placed at the other side of the regeneration path and configured to discharge the air passed through the desiccant rotor to the outside; and
filters configured to filter various foreign substances or bacteria around at least one of the regeneration inlet port and the regeneration outlet port.

6. The desiccant cooling system of claim 4, further comprising a heating device between the desiccant rotor and the regeneration inlet port within the regeneration path and configured to heat the air before the air passes through the desiccant rotor.

7. The desiccant cooling system of claim 1, wherein the cooler is a sensible rotor.

8. The desiccant cooling system of claim 1, wherein the cooler is a regenerative evaporative cooler.

9. The desiccant cooling system of claim 6, wherein the heating device is a heating coil that heats by electricity.

10. The desiccant cooling system of claim 6, wherein the heating device is a hot water heat exchanger.

11. The desiccant cooling system of claim 4, wherein the desiccant cooling device further comprises a ventilation air supply port on the desiccant cooling path and configured to supply a part of the air passed through the cooler to an air-conditioning space.

12. The desiccant cooling system of claim 11, wherein the desiccant cooling device further comprises a ventilation introduction port on the desiccant cooling path and configured to recover the air from the air-conditioning space and introduce the recovered air between the cooler and the condenser.

13. The desiccant cooling system of claim 5, wherein the desiccant cooling device further comprises an introduction port for exclusive use for ventilation along the regeneration path and configured to recover air from the air-conditioning space and introduce the recovered air between the regeneration inlet port and the desiccant rotor.

14. The desiccant cooling system of claim 13, wherein the desiccant cooling device further comprises an air supply port for exclusive use for ventilation along the desiccant cooling path and configured to supply the air passed through the desiccant rotor in the air-conditioning space.

15. A desiccant cooling system comprising:
a desiccant cooling device partitioned by a barrier wall into a desiccant cooling path and a regeneration path and comprising a desiccant rotor having one side on the desiccant cooling path and other side on the regeneration path and a cooler, provided downstream of the desiccant rotor in the desiccant cooling path, configured to cool high-temperature low-humidity air which has been dehumidified while passing through the one side of the desiccant rotor; and
a vapor compression cooling device comprising
a compressor configured to compress a refrigerant,
a condenser, provided downstream of the cooler in the desiccant cooling path, configured to be cooled by the air cooled by passing through the cooler and condense the refrigerant compressed by the compressor,
an expansion valve configured to expand the refrigerant condensed by the condenser, and
an evaporator configured to evaporate the refrigerant expanded by the expansion valve and transfer the evaporated refrigerant to the compressor,
wherein the desiccant rotor comprises a rotation shaft configured to rotate the desiccant rotor, and
wherein the air of the desiccant cooling path is discharged from the desiccant cooling path toward outside of the desiccant cooling device after passing through the condenser.

16. A desiccant cooling system comprising:
a desiccant cooling device partitioned by a barrier wall into a desiccant cooling path and a regeneration path and comprising a desiccant rotor having one side on the desiccant cooling path and other side on the regeneration path and a cooler, provided downstream of the desiccant rotor in the desiccant cooling path, configured to cool high-temperature low-humidity air which has been dehumidified while passing through the one side of the desiccant rotor; and a vapor compression cooling device comprising
- a compressor configured to compress a refrigerant,
- a condenser, provided downstream of the cooler in the desiccant cooling path, configured to be cooled by the air cooled by passing through the cooler and condense the refrigerant compressed by the compressor,
- an expansion valve configured to expand the refrigerant condensed by the condenser, and
- an evaporator configured to evaporate the refrigerant expanded by the expansion valve and transfer the evaporated refrigerant to the compressor, wherein the desiccant cooling device further comprises:

a process inlet port placed at one side of the desiccant cooling path and configured to draw out air of an outdoor space into the desiccant cooling path;

a process outlet port placed at the other side of the desiccant cooling path and configured to discharge the air passing through the condenser toward outside of the desiccant cooling device; and filters configured to filter various foreign substances or bacteria around at least one of the process inlet port and the process outlet port.

\* \* \* \* \*